(12) United States Patent
Mueller et al.

(10) Patent No.: US 12,289,800 B2
(45) Date of Patent: Apr. 29, 2025

(54) ACTIVATION OF ONE OF A MAXIMUM NUMBER OF COMMUNICATION PROFILES ASSOCIATED WITH A USER

(71) Applicant: Bayerische Motoren Werke Aktiengesellschaft, Munich (DE)

(72) Inventors: Thomas Mueller, Munich (DE); Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 332 days.

(21) Appl. No.: 17/801,352

(22) PCT Filed: Feb. 24, 2020

(86) PCT No.: PCT/EP2020/054802
§ 371 (c)(1),
(2) Date: Aug. 22, 2022

(87) PCT Pub. No.: WO2021/170214
PCT Pub. Date: Sep. 2, 2021

(65) Prior Publication Data
US 2023/0084955 A1   Mar. 16, 2023

(51) Int. Cl.
*H04W 8/20* (2009.01)
(52) U.S. Cl.
CPC ................... *H04W 8/205* (2013.01)
(58) Field of Classification Search
CPC ............... H04W 8/205; H04W 8/186
See application file for complete search history.

(56) References Cited

U.S. PATENT DOCUMENTS

| | | | |
|---|---|---|---|
| 10,187,784 B1 | 1/2019 | Chen et al. | |
| 10,538,220 B1 * | 1/2020 | Tyagi | B60R 25/245 |
| 10,708,766 B1 * | 7/2020 | Umamaheswaran | H04W 4/60 |

(Continued)

FOREIGN PATENT DOCUMENTS

EP    2 555 546 A1    2/2013

OTHER PUBLICATIONS

International Search Report (PCT/ISA/210) issued in PCT Application No. PCT/EP2020/054802 dated Nov. 9, 2020 (four (4) pages).

(Continued)

*Primary Examiner* — Julio R Perez
(74) *Attorney, Agent, or Firm* — Crowell & Moring LLP (57) ABSTRACT

A communication function is provided. An activation request to enable a communication profile in a first user equipment is received at a mobile network operator (MNO). The communication profile is associated with a user. A maximum number of communication profiles associated with the user can be provided at the same time. A number of communication profiles which are associated with the user and which are currently enabled are determined by the MNO. In response to determining that the number of communication profiles which are associated with the user and which are currently enabled is equal to the maximum number of communication profiles are determined, a communication profile associated with the user in a second UE is disabled, and a communication profile associated with the user in the first UE is enabled.

15 Claims, 4 Drawing Sheets

(56) References Cited

U.S. PATENT DOCUMENTS

2020/0021975 A1   1/2020  Schouler
2020/0021980 A1*  1/2020  Schouler ............... H04W 8/205
2022/0174495 A1*  6/2022  Lee ....................... H04W 12/37
2023/0308861 A1*  9/2023  Fan ....................... H04W 12/45

OTHER PUBLICATIONS

English-language Written Opinion (PCT/ISA/237) issued in PCT Application No. PCT/EP2020/054802 dated Nov. 9, 2020 (seven (7) pages).

* cited by examiner

ACTIVATION OF ONE OF A MAXIMUM NUMBER OF COMMUNICATION PROFILES ASSOCIATED WITH A USER

TECHNICAL FIELD

Embodiments of the present disclosure relate to a method of providing a communication function, a server of a mobile network operator, and a management server for user equipment. The embodiments of the present disclosure particularly relate to an implementation of communication profiles, such as eSIM profiles, in user equipment, and in particular vehicles.

BACKGROUND

Wireless communication systems are rapidly growing in usage. In particular, a user may have a variety of devices that should be equipped with communication capabilities. Such devices can be a smart phone, a tablet, a smart watch and a car. Due to certain limitations imposed by a mobile network operator, it may be difficult or even impossible to provide communication capabilities to all user devices.

In view of the above, a new method of providing a communication function, server of a mobile network operator, and management server for user equipment, that overcome at least some of the problems in the prior art are beneficial.

SUMMARY OF THE INVENTION

In light of the above, a method of providing a communication function, a server of a mobile network operator, and a management server for user equipment are provided.

It is an object of the present disclosure to enable a communication function of a user equipment. Particularly, it is an object of the present disclosure to enable a communication function of a user equipment with reduced resources and/or energy consumption.

The objects are solved by the features of the independent claims. Preferred embodiments are defined in the dependent claims.

According to an aspect of the present disclosure, a method of providing a communication function is provided. The method includes receiving, at a mobile network operator, MNO, an activation request to enable or activate a communication profile in a first user equipment, UE, wherein the communication profile is associated with a user, and wherein a maximum number of communication profiles associated with the user can be provided (e.g., enabled or activated) at the same time; and determining, by the MNO, a number of communication profiles which are associated with the user and which are currently enabled or activated.

According to some embodiments, which can be combined with other embodiments described herein, if the number of communication profiles which are associated with the user and which are currently enabled or activated is equal to the maximum number of communication profiles, the method further includes disabling or deactivating a communication profile associated with the user in a second UE; and enabling or activating a communication profile associated with the user in the first UE.

The term "enable" as used throughout the present disclosure refers to an activation of the communication profile. Likewise, the term "disable" as used throughout the present disclosure refers to a deactivation of the communication profile. The term "disable" may be similar to a flight mode of a mobile device.

According to some embodiments, which can be combined with other embodiments described herein, if the number of communication profiles which are associated with the user and which are currently provided (e.g., enabled or activated) is less than the maximum number of communication profiles, the method further includes enabling or activating a communication profile associated with the user in the first UE without disabling or deactivating a communication profile associated with the user in the second UE.

According to some embodiments, which can be combined with other embodiments described herein, the method further includes providing, by the MNO to the first UE or a management server of the first UE, an indication whether the communication profile of the second UE has been disabled or deactivated or not.

According to some embodiments, which can be combined with other embodiments described herein, when the indication indicates that the communication profile of the second UE has been disabled or deactivated by the MNO, the disabling or deactivating of the communication profile associated with the user in the second UE further includes: deleting the communication profile associated with the user in the second UE by a management server of the first UE and the second UE.

According to some embodiments, which can be combined with other embodiments described herein, the activation request is sent by a management server of the first UE and the second UE to the MNO.

According to some embodiments, which can be combined with other embodiments described herein, the activation request includes an identifier of a communication profile associated with the user and which is currently enabled or activated. In particular, a management server of the first UE may indicate a communication profile which can be deactivated and deleted. The indication may be included in every activation request regardless of whether the MNO uses the identifier to disable a profile. This is because the management server may not know the maximum number of communication profiles.

According to some embodiments, which can be combined with other embodiments described herein, the identifier indicates the communication profile of the second UE, e.g., by means of an integrated circuit card identifier, ICCID.

According to some embodiments, which can be combined with other embodiments described herein, the MNO disables or deactivates the communication profile of the second UE according to the identifier.

According to some embodiments, which can be combined with other embodiments described herein, the identifier is an integrated circuit card identifier, ICCID.

According to some embodiments, which can be combined with other embodiments described herein, the enabling or activating of the communication profile associated with the user in the first UE includes: providing, by the MNO, an activation response including an activation code for the communication profile to the first UE or a management server of the first UE.

According to some embodiments, which can be combined with other embodiments described herein, the enabling or activating of the communication profile associated with the user in the first UE includes: initiating, by the first UE or the management server of the first UE, a download of the communication profile from the MNO; and installing the communication profile in the first UE.

According to some embodiments, which can be combined with other embodiments described herein, the communication profile is an embedded subscriber identification module, eSIM, profile. However, the present disclosure is not limited thereto, and a conventional SIM may be used or another non-SIM communication profile.

The eSIM (embedded subscriber identity module) is a standardized procedure for the secure embedding of subscriber information in a module of a telecommunications device. For communication via eSIM, security or data confidentiality is crucial. For this purpose, the module contains a standardized digital certificate. Worldwide, a large number of different certificates exist, whereby a certain type of eSIM only works with a certain type of certificate.

According to some embodiments, which can be combined with other embodiments described herein, the first UE and the second UE are selected from the group including a mobile terminal, a communication module, a communication module of a vehicle, and a vehicle, but are not limited thereto.

The term "user equipment" includes computer devices which are mobile (e.g., vehicles) and/or portable (e.g., smartphones) and which are configured for wireless communication. Examples of UE devices include mobile telephones or smart phones, portable gaming devices, laptops, wearable devices (e.g., smart watches, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is capable of wireless communication.

The term "vehicle" includes passenger cars, trucks, buses, campers, motorcycles, etc., which are used to transport people, goods, etc. In particular, the term includes motor vehicles for the transport of persons.

The term "mobile terminal" includes in particular smartphones, but also other mobile telephones or cell phones, personal digital assistants (PDAs), tablet PCs, smart watches, smart glasses, and all current and future electronic devices that are equipped with communication technology.

According to another independent aspect of the present disclosure, a computer readable storage medium is provided. The computer readable storage medium includes instructions which, when executed on one or more processors, cause the one or more processors to perform the method of providing a communication function of the present disclosure.

The term "computer readable storage medium" includes various types of non-transitory memory devices or storage devices. The term "storage medium" is intended to include a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The storage medium may include other types of non-transitory memory as well or combinations thereof.

According to another independent aspect of the present disclosure, a server of a mobile network operator, MNO, is provided. The server includes one or more processors configured to: receive an activation request to enable or activate a communication profile in a first user equipment, UE, wherein the communication profile is associated with a user, and wherein a maximum number of communication profiles associated with the user can be provided (e.g., enabled or activated) at the same time; and determine a number of communication profiles which are associated with the user and which are currently enabled or activated. If the number of communication profiles which are associated with the user and which are currently enabled or activated is equal to the maximum number of communication profiles, the one or more processors are further configured to: disable or deactivate a communication profile associated with the user in a second UE; and enable or activate a communication profile associated with the user in the first UE.

According to another independent aspect of the present disclosure, a management server for user equipment, UE, is provided. The management server includes one or more processors configured to: send, to a mobile network operator, MNO, an activation request to enable or activate a communication profile in a first user equipment managed by the management server, wherein the communication profile is associated with a user, and wherein the activation request includes an identifier of another communication profile associated with the user and which is currently enabled or activated in another UE managed by the management server.

According to another independent aspect of the present disclosure, a management server for user equipment, UE, is provided. The management server includes one or more processors configured to: send, to a mobile network operator, MNO, an activation request to enable or activate a communication profile in a first user equipment, wherein the communication profile is associated with a user. If a number of communication profiles which are associated with the user and which are currently enabled or activated is equal to a maximum number of communication profiles, the one or more processors are configured to disable or deactivate a communication profile associated with the user in a second UE; and enable or activate a communication profile associated with the user in the first UE.

Further aspects, benefits, and features of the present disclosure are apparent from the claims, the description, and the accompanying drawings.

Embodiments are also directed at devices for carrying out the disclosed methods and include device parts for performing each described method aspect. These method aspects may be performed by way of hardware components, a computer programmed by appropriate software, by any combination of the two or in any other manner. Furthermore, embodiments according to the invention are also directed at methods for operating the described servers and user equipment. It includes method aspects for carrying out every function of the servers and user equipment.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF THE DRAWINGS

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

A user may have a variety of devices that should be equipped with communication capabilities. Such devices can be a smart phone, a tablet, a smart watch and a car. Due to certain limitations imposed by a mobile network operator, it may be difficult or even impossible to provide communication capabilities to all of the user's devices.

The present disclosure overcomes the above drawbacks by enabling a communication function in a user equipment even if a number of communication profiles, which can be used simultaneously, is limited.

Figure 1:
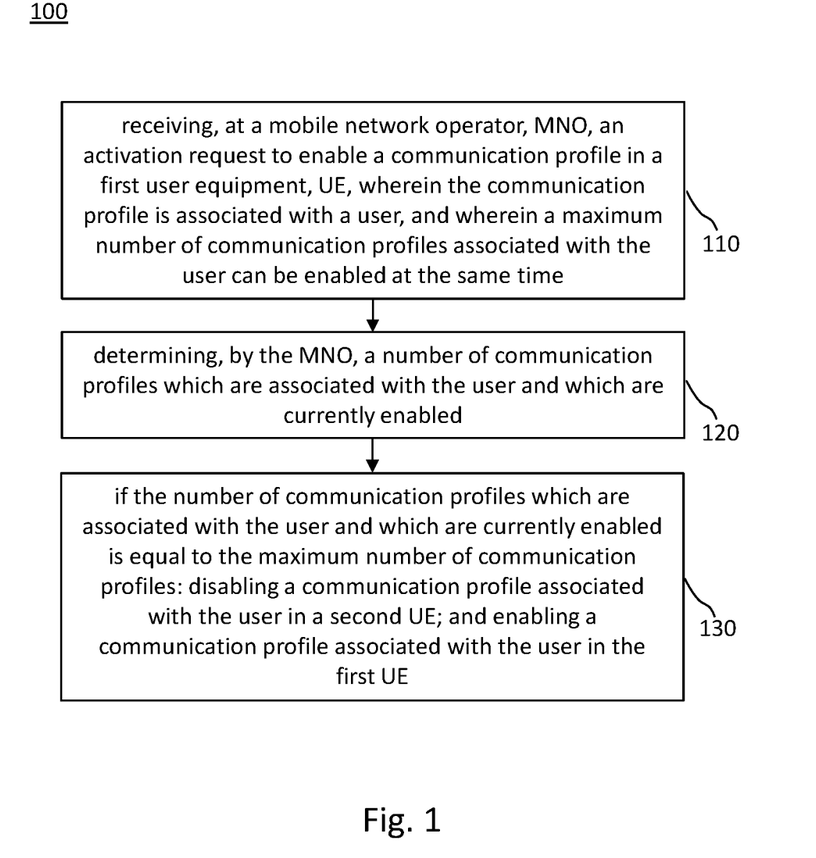
FIG. 1 shows a flow chart of method of providing a communication function according to embodiments described herein.

Although the embodiments of the present disclosure are described with reference to a vehicle, it is to be understood that the present disclosure is not limited thereto and that the embodiments described herein may be implemented in and/or used with a number of different types of UE devices, including but not limited to cellular phones, tablet computers, wearable computing devices, portable media players, vehicles, and any of various other computing devices FIG. 1 shows a flow chart of method 100 of a providing a communication function according to embodiments described herein.

According to embodiments described herein, the method 100 of providing a communication function can be conducted by means of computer programs, software, computer software products and the interrelated controllers, which can have a CPU, a memory, a user interface, and input and output means.

The method 100 includes in block 110 a receiving, at a mobile network operator, MNO, of an activation request to enable or activate a communication profile in a first user equipment, UE, wherein the communication profile is associated with a user, and wherein a maximum number of communication profiles associated with the user can be provided (e.g., enabled or activated) at the same time; and in block 120 a determining, by the MNO, of a number of communication profiles which are associated with the user and which are currently enabled or activated. The method 100 further includes in block 130, if the number of communication profiles which are associated with the user and which are currently enabled or activated is equal to the maximum number of communication profiles, a disabling or deactivating of a communication profile associated with the user in a second UE; and an enabling or activating of a communication profile associated with the user in the first UE.

In an embodiment, a management server of the first UE and the second UE requests a new activation code for the first UE, which may be a vehicle. In particular, the management server may request the new activation code when a user gets into a vehicle which has no eSIM profile for the user yet. Then, the communication profile will be downloaded in the vehicle in which the user has logged in, using the activation code provided by the MNO. For example, if the user uses three different vehicles, three profiles (one in each vehicle) will be downloaded.

However, the user's subscription with the MNO might have a limited number of eSIM slots in the mobile subscription. In this case, an eSIM slot is the capability of the user to add an eSIM profile to the user's subscription. When the user has, for example, ten eSIM slots, the user could download a maximum number of ten eSIM profiles.

With this limited number of eSIM slots, the user could download eSIM profiles to ten different vehicles. When the limit is reached, the user experience would change, because before reaching the limit, the customer gets profiles for each new vehicle in which the customer logs in and after reaching the limit, the customer would not get any new profiles without further effort and/or costs.

In order to overcome the above drawbacks when reaching the limit, the embodiments of the present disclosure introduce the profile swap concept which makes the request of new profiles seamless, even when the maximum number of eSIM profiles in a subscription is reached.

Figure 2:
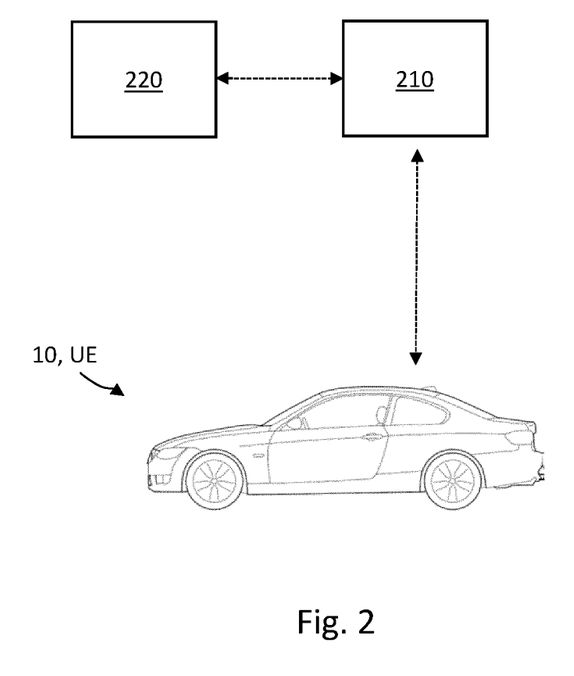
FIG. 2 shows a schematic view of servers and a vehicle according to embodiments described herein.

FIG. 2 shows a schematic view of servers 210, 220 and a vehicle/UE 10 according to embodiments described herein.

In the present example, the UE is a vehicle or a communication module of the vehicle 10. However, the present disclosure is not limited thereto and the embodiments may be implemented in and/or used with a number of different types of UE devices, including but not limited to cellular phones, tablet computers, wearable computing devices, portable media players, and any of various other computing devices.

Further, a management server 210 for user equipment and a server 220 of a mobile network operator, MNO, are shown.

The MNO may also be referred to as a wireless service provider, wireless carrier, cellular company, or mobile network carrier, and is a provider of wireless communications services that owns or controls all the elements necessary to sell and deliver services to a user. In particular, the MNO owns or controls the elements of the network infrastructure necessary to provide services to subscribers (users) over a licensed spectrum.

The management server 210 is configured to manage a plurality of user equipment devices. For example, the management server 210 may be a server of a car manufacturer which manages cars or communication capabilities of the cars.

The UEs, the MNO and the management server 210 communicate via a transmission medium, such as a network. In a preferred embodiment, the network is a mobile network managed by the MNO. The transmission medium may use any of various wireless communication technologies, or telecommunication standards, such as GSM, UMTS, LTE, LTE-Advanced (LTE-A), 5G, HSPA, and the like. A communication via future telecommunication standards is possible.

Figure 3:
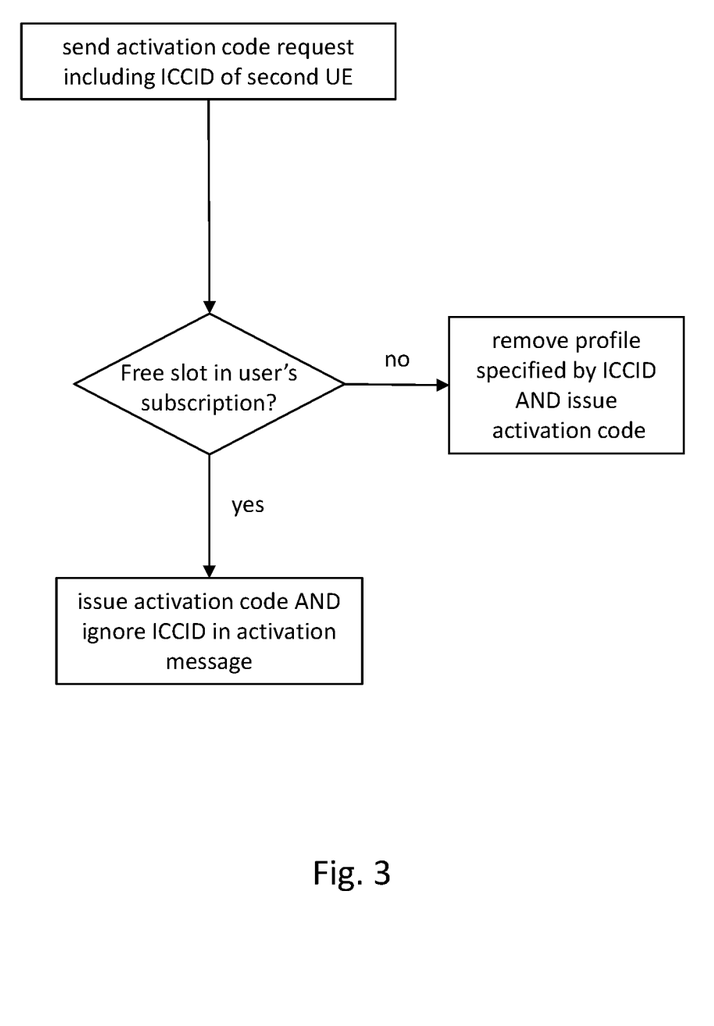
FIG. 3 shows a schematic view of a profile swap to provide a communication function according to embodiments described herein.
Figure 4:
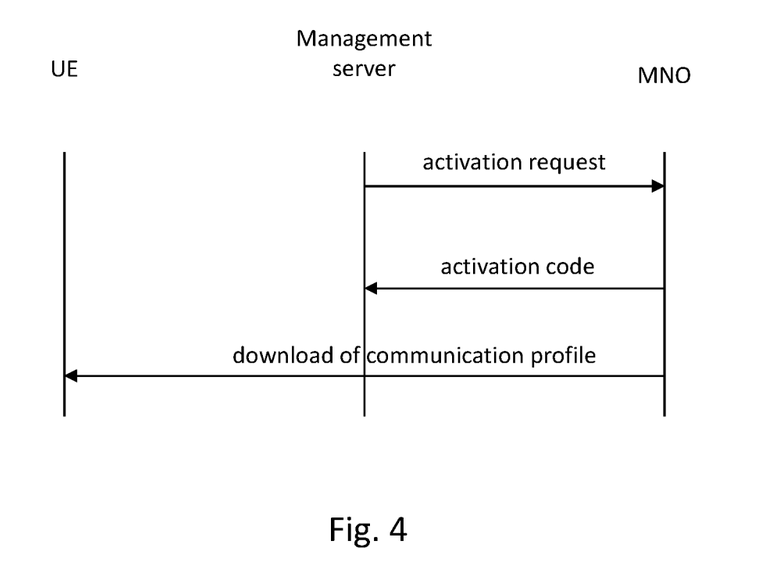
FIG. 4 shows a schematic view of messages sent to provide a communication function according to embodiments described herein.

FIG. 3 shows a schematic view of a profile swap to provide a communication function according to embodiments described herein. FIG. 4 shows a schematic view of messages sent to provide a communication function according to embodiments described herein.

In the following, a profile swap according to an example embodiment of the present disclosure is explained.

The server of the MNO includes one or more processors configured to: receive an activation request to enable or activate a communication profile in a first user equipment, UE, wherein the communication profile is associated with a user, and wherein a maximum number of communication profiles associated with the user can be enabled or activated at the same time; and determine a number of communication profiles which are associated with the user and which are currently enabled or activated. If the number of communication profiles which are associated with the user and which are currently enabled is equal to the maximum number of communication profiles, the one or more processors are further configured to: disable or deactivate a communication profile associated with the user in a second UE; and enable or activate a communication profile associated with the user in the first UE.

In addition, the management server includes one or more processors configured to: send, to a mobile network operator, MNO, an activation request to enable or activate a communication profile in a first user equipment, wherein the communication profile is associated with a user.

In some embodiments, the activation request may include an identifier of a communication profile associated with the user and which is currently enabled or activated. For example, the identifier indicates the communication profile of the second UE, wherein the MNO disables or deactivates the communication profile of the second UE according to the identifier. In some implementations, the identifier may be an integrated circuit card identifier, ICCID.

In view of the above, the activation request may indicate a communication profile (i.e. in the second UE) which can be deleted or replaced with another one in the first UE. In other words, the management server may use the activation request to indicate a communication profile of the user which can be deleted or replaced, if that would be necessary because the maximum number of communication profiles of the user's subscription has been reached (e.g., via a parameter "replaceICCID" in the activation request).

In more detail, the following scenarios can be distinguished (n indicates the number of communication profiles enabled in UEs managed by the UE management server):
1. n=0: The user gets into a first vehicle and no communication profile has been downloaded for the user in any vehicle managed by the UE management server (e.g., after initial onboarding).
2. n=1: The user gets into a second vehicle, i.e., there is one other vehicle managed by the UE management server for which a communication profile has been downloaded for the user.
3. n>1: The user has multiple communication profiles downloaded in multiple vehicles managed by the UE management server.

In the first scenario (n=0), the parameter "replaceICCID" will not be sent by the management server in the activation request.

In the second scenario (n=1), the management server will send the ICCID of the other vehicle (first vehicle/second UE), on which a communication profile is enabled, in the activation request. Thereby, the UE management server indicates to the MNO that the communication profile of the first vehicle/second UE could be disabled, if necessary, in order to allow a download and activation of a communication profile in the second vehicle (first UE).

In the third scenario (n>1), the management server will determine an ICCID of a communication profile of one of the vehicles managed by the UE management server (i.e. a vehicle which has a downloaded communication profile) and send this ICCID in the activation request to the MNO. For example, this could be the ICCID of a least used communication profile.

In view of the above, a new parameter "replaceICCID" may be added e.g., when the management server uses the API "request activation code": The management server will send an ICCID of a communication profile which was downloaded for the user in another vehicle. When no profile has been downloaded for the user yet, the parameter "replaceICCID" is not sent by the management server.

Turning now to FIG. 4, the management server sends the activation request ("request activation code") including the "replaceICCID", and the MNO reacts as illustrated.

In more detail, the MNO checks if the user has reached the maximum number of eSIM profiles for his/her subscription. If the user has reached the maximum number of eSIM profiles for his/her subscription, this means that the activation request cannot be answered with an activation code, because the user cannot download any more eSIM profiles.

If the user has not reached the maximum number of eSIM profiles for his/her subscription, the MNO returns an activation code and indicates that the communication profile was not swapped. The activation code could either be included in the response of the activation request, or the MNO could use the API "send activation code" (e.g., in a synchronous or asynchronous response mode). The indication that the MNO did not swap the eSIM profile is done by the MNO e.g., by setting a parameter "profileReplaced" to "false".

When the MNO indicates that the communication profile has not been swapped, the management server can initiate a download of the communication profile in the vehicle for which the activation code was requested.

If the user has reached the maximum number of eSIM profiles for his/her subscription, the MNO can return an activation code and indicate, that the profile was swapped. This means that the MNO has removed the ICCID which was specified by the management server in "replaceICCID" from the user's subscription and replaced this old communication profile with the communication profile which belongs to the newly issued activation code.

The indication that the MNO swapped the eSIM profile may be done by setting the parameter "profileReplaced" to "true". When the management server receives this indication together with the new activation code, the management server will delete the communication profile which was specified in "replaceICCID" from the corresponding UE.

Using the profile swapping principle of the present disclosure, the user gets new eSIM profiles seamlessly on each UE the customer logs in, even when the user's subscription has a maximum number of eSIM slots. Thereby, a more efficient communication is created, and less computing resource are used to enable communication profiles.

While the foregoing is directed to embodiments of the disclosure, other and further embodiments of the disclosure may be devised without departing from the basic scope thereof, and the scope thereof is determined by the claims that follow.

The invention claimed is:

1. A method of providing a communication function, comprising:
   receiving, at a mobile network operator (MNO), an activation request to enable a communication profile in a first user equipment (UE), wherein the communication profile is associated with a user, and a maximum number of communication profiles associated with the user can be provided at the same time;

determining, by the MNO, how many communication profiles associated with the user are currently enabled; and determining that the number of currently enabled communication profiles is equal to the maximum number of communication profiles; and in response to determining that the number of currently enabled communication profiles is equal to the maximum number of communication profiles, disabling a communication profile associated with the user in a second UE, and enabling a communication profile associated with the user in the first UE.

2. The method of claim 1, further comprising:

determining that the number of currently enabled communication profiles is less than the maximum number of communication profiles; and in response to determining that the number of currently enabled communication profiles is less than the maximum number of communication profiles, enabling a communication profile associated with the user in the first UE without disenabling a communication profile associated with the user in the second UE.

3. The method of claim 2, further comprising:

providing, by the MNO to the first UE or a management server of the first UE, an indication whether the communication profile of the second UE has been disabled or not.

4. The method of claim 3, wherein, when the indication indicates that the communication profile of the second UE has been disabled by the MNO, the disabling of the communication profile associated with the user in the second UE further includes: deleting the communication profile associated with the user in the second UE by a management server of the first UE and the second UE.

5. The method of claim 1, wherein the activation request is sent by a management server of the first UE and the second UE to the MNO.

6. The method of claim 1, wherein the activation request includes an identifier of a currently enabled communication profile associated with the user.

7. The method of claim 6, wherein the identifier indicates the communication profile of the second UE, and the MNO disables the communication profile of the second UE according to the identifier.

8. The method of claim 6, wherein the identifier is an integrated circuit card identifier (ICCID).

9. The method of claim 1, wherein the enabling of the communication profile associated with the user in the first UE includes: providing, by the MNO, an activation response including an activation code for the communication profile to the first UE or a management server of the first UE.

10. The method of claim 1, wherein the enabling of the communication profile associated with the user in the first UE includes:

initiating, by the first UE or a management server of the first UE, a download of the communication profile from the MNO; and installing the communication profile in the first UE.

11. The method of claim 1, wherein the communication profile is a subscriber identification module (SIM) profile, or an embedded subscriber identification module (SIM) profile.

12. The method of claim 11, wherein the first UE and the second UE are selected from the group consisting of:
a mobile terminal,
a communication module,
a communication module of a vehicle, and
a vehicle.

13. A non-transitory computer-readable storage medium comprising instructions which, when executed on one or more processors, cause the one or more processors to perform the method of claim 1.

14. A server of a mobile network operator (MNO) comprising one or more processors configured to:

receive an activation request to enable a communication profile in a first user equipment, UE, wherein the communication profile is associated with a user, and wherein a maximum number of communication profiles associated with the user can be provided at the same time;

determine how many communication profiles associated with the user are currently enabled; and determine that the number of currently enabled communication profiles is equal to the maximum number of communication profiles; and in response to determining that the number of currently enabled communication profiles is equal to the maximum number of communication profiles, disable a communication profile associated with the user in a second UE, and enable a communication profile associated with the user in the first UE.

15. A management server for user equipment (UE) comprising one or more processors configured to:

send, to a mobile network operator (MNO), an activation request to enable a communication profile in a first UE, wherein the communication profile is associated with a user, and the activation request includes an identifier of another communication profile associated with the user and which is currently enabled in another UE, wherein the MNO is configured receive the activation request and, based on a determination of whether the number of currently enabled communication profiles is equal to a maximum number of communication profiles: disable the other communication profile currently enabled in the other UE, and enable the communication profile in the first UE.

\* \* \* \* \*